US012766719B2

(12) United States Patent
Holmberg et al.

(10) Patent No.: US 12,766,719 B2
(45) Date of Patent: Oct. 20, 2026

(54) ROBOT WITH ARTICULATED OR VARIABLE LENGTH UPPER ARM

(71) Applicant: Dexterity, Inc., Redwood City, CA (US)

(72) Inventors: Robert Holmberg, Mountain View, CA (US); Michael Fisher, Palo Alto, CA (US); Zhouwen Sun, San Mateo, CA (US); Samir Menon, Menlo Park, CA (US); Vikas Agrawal, Santa Clara, CA (US); Avinash Verma, Fremont, CA (US)

(73) Assignee: Dexterity, Inc., Redwood City, CA (US)

( * ) Notice: Subject to any disclaimer, the term of this patent is extended or adjusted under 35 U.S.C. 154(b) by 92 days.

(21) Appl. No.: 18/586,119

(22) Filed: Feb. 23, 2024

(65) Prior Publication Data

US 2024/0286284 A1 Aug. 29, 2024

Related U.S. Application Data

(60) Provisional application No. 63/447,986, filed on Feb. 24, 2023.

(51) Int. Cl.
*B25J 9/16* (2006.01)
*B25J 18/00* (2006.01)

(52) U.S. Cl.
CPC ............ *B25J 9/1664* (2013.01); *B25J 18/00* (2013.01)

(58) Field of Classification Search
CPC ................................ B25J 9/1664; B25J 18/00
See application file for complete search history.

(56) References Cited

U.S. PATENT DOCUMENTS

| | | | | |
|---|---|---|---|---|
| 5,737,500 | A | 4/1998 | Seraji | |
| 5,739,655 | A * | 4/1998 | Torii | B62D 57/00 305/1 |
| 11,673,264 | B2 * | 6/2023 | Nikovski | G06N 20/00 700/246 |
| 12,397,440 | B1 * | 8/2025 | Augenbraun | G05D 1/0214 |
| 2003/0023346 | A1 | 1/2003 | Salisbury, Jr. | |
| 2004/0054437 | A1 * | 3/2004 | Kimura | B25J 9/1674 700/245 |
| 2008/0304935 | A1 * | 12/2008 | Scott | A61H 1/0237 623/27 |
| 2010/0204713 | A1 | 8/2010 | Ruiz Morales | |
| 2012/0158017 | A1 | 6/2012 | Naylor | |

(Continued)

*Primary Examiner* — Sohana Tanju Khayer

(74) *Attorney, Agent, or Firm* — Van Pelt, Yi & James LLP

(57) ABSTRACT

A robotic system includes a robotic arm that includes a first joint that connects a first segment to a second segment, the first segment being connected at an end of the first segment opposite the first joint to a shoulder joint of the robotic arm and the second segment being connected at an end of the second segment opposite the first joint to an elbow joint of the robotic arm; and a processor coupled to the robotic arm and configured to receive an end effector trajectory and determine a motion plan to move the end effector through the end effector trajectory, including by using the first joint to vary the distance between the shoulder joint and the elbow joint, as and if needed, to realize the end effector trajectory while using the joints and links other than the first joint in a preferred pose.

24 Claims, 8 Drawing Sheets

(56) References Cited

U.S. PATENT DOCUMENTS

| | | | | |
|---|---|---|---|---|
| 2013/0237883 | A1* | 9/2013 | Malosio | A61H 1/0281 601/33 |
| 2014/0222021 | A1* | 8/2014 | Diolaiti | A61B 34/37 606/130 |
| 2016/0221189 | A1* | 8/2016 | Nilsson | B25J 9/1653 |
| 2016/0302875 | A1 | 10/2016 | Hourtash | |
| 2016/0339590 | A1 | 11/2016 | Lin | |
| 2017/0274533 | A1 | 9/2017 | Berghofer | |
| 2019/0291272 | A1* | 9/2019 | Doan | B25J 9/1664 |
| 2019/0350662 | A1 | 11/2019 | Huang | |
| 2020/0283242 | A1* | 9/2020 | Osaka | B25J 9/1633 |
| 2020/0297444 | A1 | 9/2020 | Camarillo | |
| 2021/0001483 | A1* | 1/2021 | Milenkovic | B25J 9/1666 |
| 2021/0094187 | A1* | 4/2021 | Kanemoto | B25J 13/085 |
| 2021/0394579 | A1* | 12/2021 | Jang | B60G 21/0558 |
| 2022/0016781 | A1* | 1/2022 | Bachmann | B25J 9/10 |
| 2022/0108468 | A1* | 4/2022 | Nakamura | G06T 7/73 |
| 2022/0226995 | A1* | 7/2022 | Beck | B25J 9/1641 |
| 2022/0305645 | A1 | 9/2022 | Nikovski | |
| 2022/0354597 | A1* | 11/2022 | Kaouk | A61B 34/30 |
| 2023/0062371 | A1* | 3/2023 | Motonaga | B25J 9/1612 |
| 2023/0278218 | A1* | 9/2023 | Terry | B25J 9/1682 700/255 |
| 2023/0347518 | A1* | 11/2023 | Erlewein | B25J 9/1676 |
| 2024/0042626 | A1* | 2/2024 | Kawaguchi | B25J 15/10 |
| 2024/0155241 | A1* | 5/2024 | Usui | G06T 7/73 |
| 2025/0205911 | A1* | 6/2025 | Kikuchi | B25J 18/00 |

* cited by examiner

ROBOT WITH ARTICULATED OR VARIABLE LENGTH UPPER ARM

CROSS REFERENCE TO OTHER APPLICATIONS

This application claims priority to U.S. Provisional Patent Application No. 63/447,986 entitled ROBOT WITH ARTICULATED OR VARIABLE LENGTH UPPER ARM filed Feb. 24, 2023, which is incorporated herein by reference for all purposes.

BACKGROUND OF THE INVENTION

Robotic arms are used in many different industrial settings to perform a variety of tasks. A robotic arm may comprise a sequence of serially connected links each pair of links having one or more robotically controlled joints associated with the pair, each joint providing a degree of freedom, i.e., a robotically controlled ability to rotate or bend at the joint. A robotic arm commonly used in industrial settings is the 6 degree of freedom (6DOF) robotic arm.

A typical 6DOF robotic arm may be mounted on a fixed base or column. A "shoulder" joint at or near the base may provide one or more degrees of freedom. The robotic arm may include an "upper" arm link or segment connected at a proximal (to the base) end to the shoulder joint and to an "elbow" joint at the distal end. The elbow joint may connect the upper arm link or segment to a "forearm" link or segment and may provide one or more additional degrees of freedom. A "wrist" joint provided at the distal end of the forearm segment provides the remaining degrees of freedom. For example, the wrist joint may provide roll, pitch, and yaw degrees of freedom. The wrist may provide a mounting point for a robotically controlled end effector, such as a hand, gripper, or suction-based end effector, to be mounted.

One control regime used to control robotic arms is operational space control, in which the end effector is moved through a trajectory while being held in a specific pose (e.g., orientation). For example, a suction-based end effector may be used to grasp a box by applying suction to the top surface of the box. The box may be lifted and moved through a trajectory while the end effector remains substantially parallel to the ground, for example.

When operational space control is used, a condition known as a "singularity" can occur that can lead to instability as a consequence of the mathematics used to implement operational space control. For example, for certain robotic arms, a "wrist" singularity can occur if the elbow and wrist joints are aligned (e.g., axes of rotation parallel or coincident, depending on the design). One example of a context in which such a singularity could occur is using a 6DOF robotic arm to pick up an object from the ground near it's shoulder/base.

Typically, a robotic arm cannot be moved (or cannot be moved smoothly or continuously) through a trajectory that would place the arm in a singularity. Singularities may be possible to handle within the physical constraints of the robot, e.g., by rotating two or more joints simultaneously to another orientation then proceeding, but the solution may not be easy or possible to achieve or implement. In some prior approaches, trajectory planning required an additional step to ensure a planned trajectory would not put the robot in singularity. This check takes time and computing resources, and a different plan must be generated if a singularity is found. In another (or combined) approach, a separate controller configured specifically to control the robot at or at it moves through a singularity is used, adding further complexity.

BRIEF DESCRIPTION OF THE DRAWINGS

Various embodiments of the invention are disclosed in the following detailed description and the accompanying drawings.

DETAILED DESCRIPTION

Figure 1A:
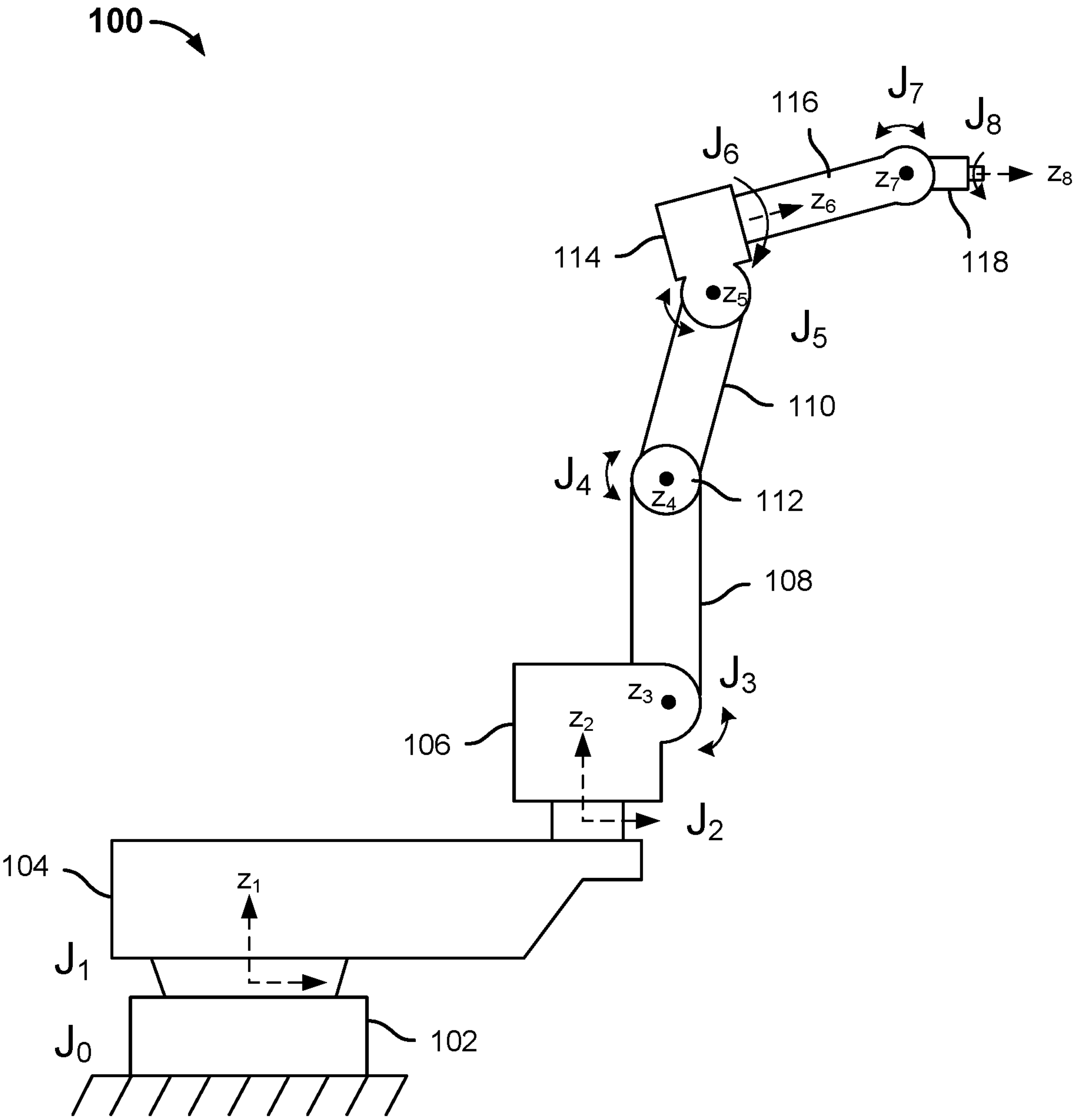
FIG. 1A is a diagram illustrating an embodiment of a robotic system comprising a robotic arm with an articulated upper arm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic arm (or other robotic serial manipulator) having articulated, modular, variable length, or other mechanism to vary the distance between the shoulder and elbow (and/or other adjacent pairs of joints) is disclosed. In various embodiments, a robotic arm having an added joint between the shoulder and elbow is provided. The added joint(a) allow(s) for one or more control objectives to be achieved in real time using a single control strategy, e.g., avoidance of singularities, collision free operation in tight spaces, and rapid acceleration and/or movement with advantageous pose/positioning of the joints and links comprising the robot.

In various embodiments, singularities are avoided without pre-planning to avoid singularities, so no upfront time is needed for a singularity check. The path to the new goal is planned directly. Because singularities are avoided, there is not a need for special-case singularity controller modes and planning of controller mode switching into and out of singularity regimes.

In various embodiments, the added joint(s) allow for remaining joints and links to be used in a pose or range of poses that enable such joints and links to be (better) used to better achieve an objective, such as to maximize or otherwise optimize one or more of end effector acceleration, speed, and load/capacity. For example, the added joint(s) may allow all or some of the joints and/or links comprising the robot to be maintained in a preferred pose or a set or range of preferred poses. The preferred pose/poses may allow those elements and/or the end effector to be moved more quickly through the trajectory without risk of collision, for example, or the preferred pose may provide advantages in terms of the mechanics and/or dynamics of motion, such as by balancing the torque required to be applied at/by one or more joints to move the end effector through the end effector trajectory. Stated another way, the added joint(s) provide additional options to use the combination of joints and links comprising the robot to perform a task, much like an athlete might use a number of muscle groups to lift or move a heavy object, or kick a soccer ball, or strike a tennis ball.

FIG. 1A is a diagram illustrating an embodiment of a robotic system comprising a robotic arm with an articulated upper arm. In the example shown in FIG. 1A, 8DOF robot 100 is mounted on a fixed base 102 (joint J0), which may be fixed to the ground or to a mobile chassis, such as chassis that rides on a rail, a four-wheel cart type chassis, etc. The robot 100 comprises an extender arm platform 104 that is rotatably mounted (joint J1) on the base 102. A robotic arm comprising joints J2 through J8, associated with shoulder 106, elbows 112 and 114, and wrist assembly 118, and the intervening links 108, 110, and 116, is rotatably mounted at an outboard end (or other extreme) of the extender arm or platform (joint J2). The extender arm or platform 104 may be rotated (J1) to position the robotic arm at locations on a circular path defined by the geometry of the extender arm or platform, specifically the distance from the joint J1 to the location at which the shoulder 106 (J2, J3) of the robotic arm is mounted. The shoulder 106 is mounted to enable robotically controlled rotation (J2) and bending (J3) at the shoulder 106.

In the example shown, an added joint 112 (J4) is included between the shoulder 106 (J2, J3) and the elbow 114 (J5, J6). The axis of rotation z4 of the added joint J4 is parallel to the respective axes of rotation z3, 25 of the shoulder joint and elbow joint, respectively, in this example, all of which are coming directly out of the page as shown in FIG. 1A. Thus, the successive and adjacent axes of rotation 23, 24, 25 are parallel. Joint J5 enables the robotic arm to bend at the elbow 114, while joint J6 allows the forearm 116 to be rotated about its longitudinal axis (26). Finally, joints J7 and J8 allow the wrist 118 to bend (27) or rotate (z8).

In various embodiments, including an added joint, such as joint 112 (J4) in the example shown, between the should and elbow enables singularities to be avoided by allowing the distance from the shoulder to the elbow to be shortened, if needed, to avoid putting other elements of the arm in a pose associated with singularity. The disclosed structure, i.e., including an "extra" elbow joint 112 interposed between the shoulder 106 and elbow 114, in essence replacing what in a traditional (e.g., 6DOF) robotic arm would be a single, continuous upper arm disposed between the shoulder 106 and elbow 114, into two segments 108, 110 joined by the added elbow 112, is sometimes referred to herein as an "articulated" link or segment. In some embodiments, presence of the added joint (e.g., 112) may enable the elbow 114 to (more readily) be kept (more) clear of potential collisions, e.g., with the sidewall of a truck or other container or workspace in which robot 100 is operating.

In some embodiments, the added joint 112 (J4) between the shoulder 106 and elbow 114 is included, but the rotatably mounted extender is not included and the shoulder is rotatably mounted directly to the base. That is, a 7DOF robot, comprising joints J2 through J8, but not joint J1, is provided.

In some embodiments, additional degrees of freedom may be provided, e.g., by mounting the robot 100 on a movable chassis, such as a rail mounted chassis (linear DOF) or cart or similar fully mobile chassis (two additional DOF).

In some embodiments, robots with more or fewer degrees of freedom are provided, while including three consecutive joints having parallel axes of rotation, to effectively enable an otherwise unitary link (e.g., upper arm) to be bent forward or back to shorten the distance between the shoulder and elbow, as disclosed herein.

In various embodiments, an 8 DOF robot as disclosed herein, such as robot 100 of FIG. 1A, may include one or both of the following:

- Extender platform (e.g., 104)
  - change form factor of the robot. Compact parked (extender rotated in to move robot inboard). Larger during work (swing arm out away from base/chassis
  - Long reach from front (if mounted at front of chassis). Wide reach between two robots (one on either side of chassis, e.g., with central mounted or positioned conveyor).
- Additional joint ("second elbow", e.g., 112, in some embodiments with axis aligned to one or both adjacent joints, e.g., J3, J4, J5)

increased reach with slightly longer shoulder-elbow distance (J3, J4, J5 joints aligned)

ability to reposition elbow (e.g., 114) to avoid wrist singularity; such wrist singularities are common for the top-down poses, e.g., to pick close to robot base or chassis (work in tight space) Avoid hitting truck/trailer walls with elbow (e.g., 114)

a. Increase distance from adjacent conveyor (or between robots either side of conveyor) and then pick off belt b. operate near front and side of robotic truck/container loader down towards ground, without singularity c. avoid elbow collisions with wall in front when placing near foot of said wall, e.g., deep in truck/container d. with lower conveyor-keep elbow from going past gripper so that two robots side by side avoid each other.

In various embodiments, an added joint is installed, as disclosed herein, between two joints of a typical existing 6DOF arm so that much of the 6DOF robots design can continue to be used and fewer new parts need to be designed. In various embodiments, each new axis has the same motion axis direction as the previous joint.

In various embodiments, a two-part controller may be used. One controller controls rotation of the extender platform, to put the robotic arm in position, then a more traditional (e.g., 6DOF) robotic arm controller controls the arm portion to perform a task. For example, extender positions arm to be able to reach an item with least (or lower) risk of collision or singularity, robotic arm controller controls arm to perform pick/place with respect to the item. The added DOF (e.g., added joint between shoulder and elbow) gives singularity free options for the controller to move the item through the planned trajectory.

In another example, a first controller controls the extender arm and the added joint (e.g., J4) to position the robotic arm and set the distance between shoulder and elbow to one expect to avoid singularity (and/or avoid elbow or other collision) for a given task (e.g., pick item, move through trajectory, and place item), then use traditional robotic arm controller (e.g., 6DOF) to control arm (e.g., joints other than added joint J4) for pick/place.

Figure 1B:
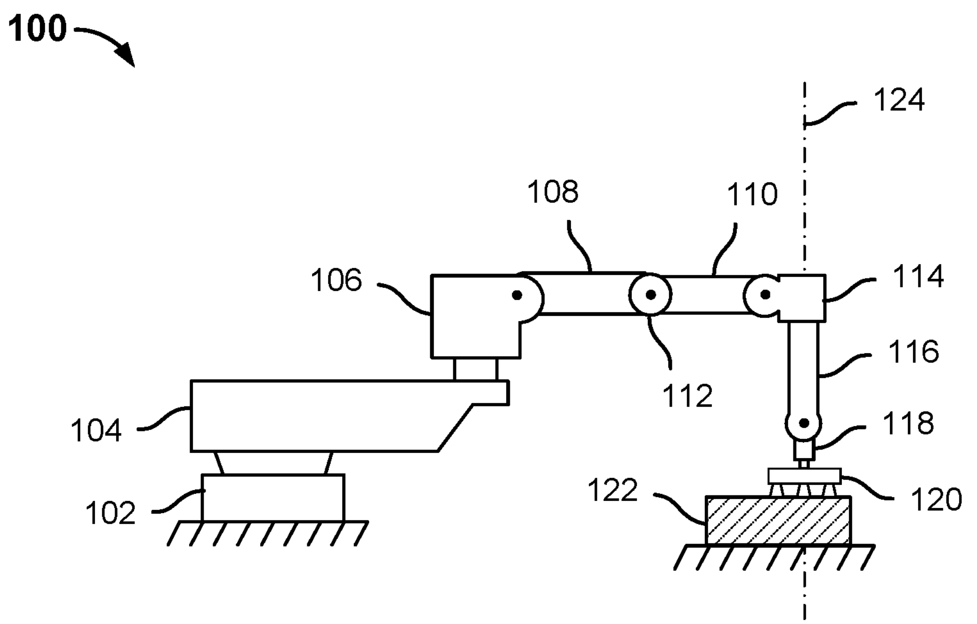
FIG. 1B is a diagram illustrating an embodiment of a robotic system comprising a robotic arm with an articulated upper arm in a position associated with singularity.

FIG. 1B is a diagram illustrating an embodiment of a robotic system comprising a robotic arm with an articulated upper arm in a position associated with singularity. In the example shown, robot 100 is equipped with a suction type gripper 120, which is being used to grasp item 122, which is on the ground some distance from base 102. In the pose shown, added joint 112 has not be used result in a wrist singularity due to the alignment of the axes of rotation of wrist 118 and elbow/forearm 114, 116 being aligned along axis 124.

Figure 1C:
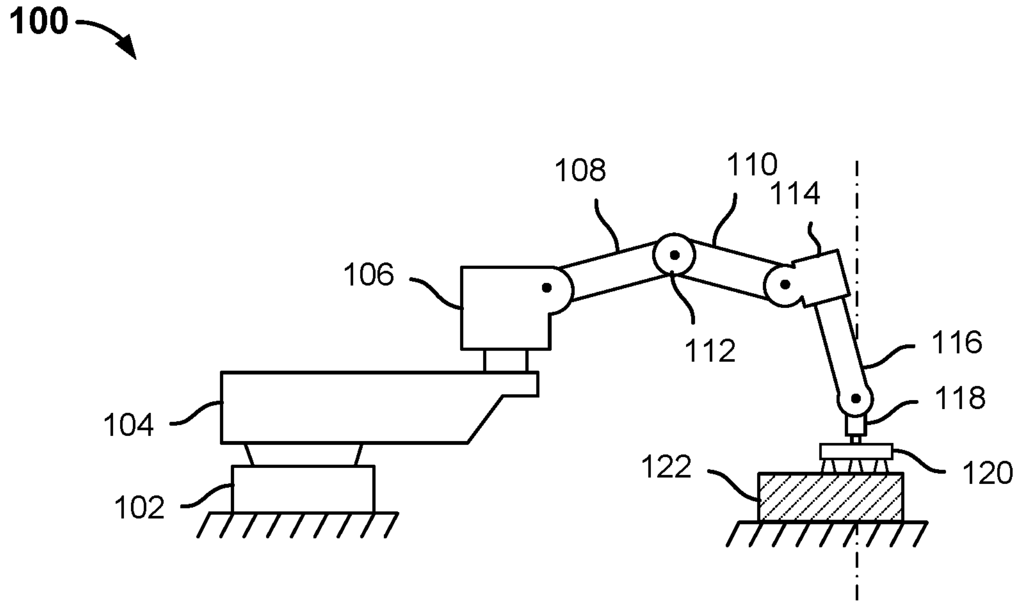
FIG. 1C is a diagram illustrating an embodiment of a robotic system comprising a robotic arm with an articulated upper arm in a pose in which a joint in the articulated upper arm is used to avoid singularity.

FIG. 1C is a diagram illustrating an embodiment of a robotic system comprising a robotic arm with an articulated upper arm in a pose in which a joint in the articulated upper arm is used to avoid singularity. In the example shown, item 122 is nearer to the base 102 of robot 100, i.e., the robot 100 has been moved closer to the item 122, e.g., by a mobile chassis (not shown), for the item 122 is placed closer to the base 102, e.g., by another worker (robot or human). In the pose shown in FIG. 1C, added elbow 112 is bent, bringing elbow 114 closer to shoulder 106 (than in the pose as shown in FIG. 1B) and thereby avoiding the wrist singularity illustrated in FIG. 1B.

Figure 1D:
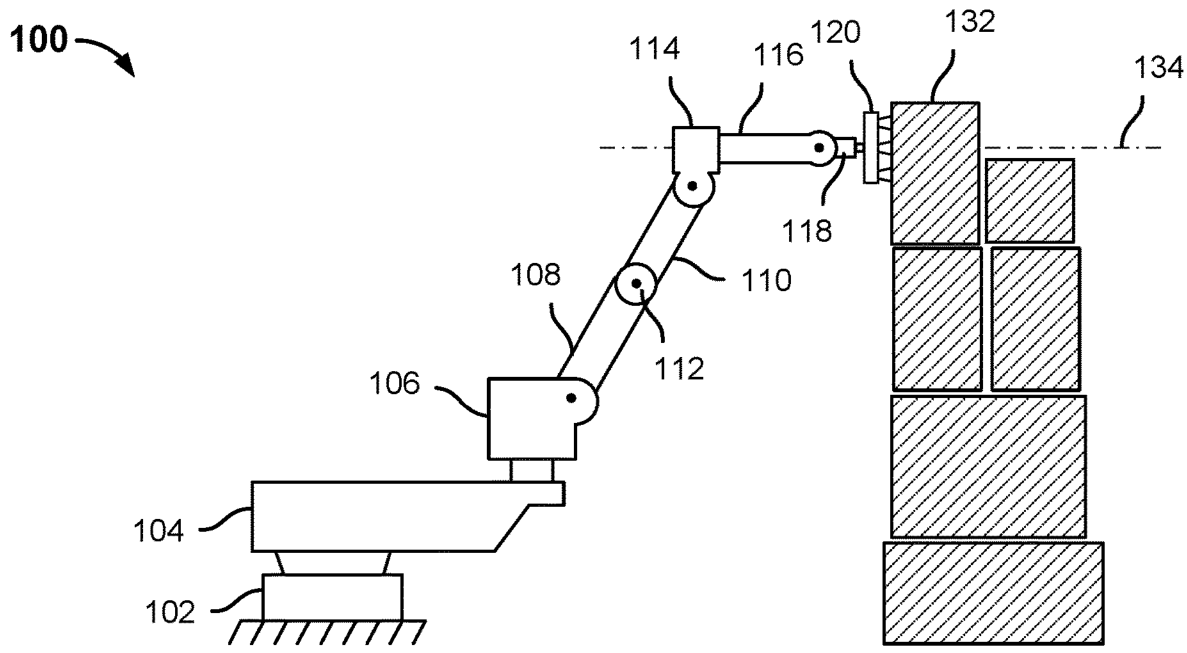
FIG. 1D is a diagram illustrating an embodiment of a robotic system comprising a robotic arm with an articulated upper arm in a position associated with singularity.

FIG. 1D is a diagram illustrating an embodiment of a robotic system comprising a robotic arm with an articulated upper arm in a position associated with singularity. In the example shown, the robot 100 is using gripper 120 to grasp (or place) item 132, in this example a box stacked on top of other boxes. In the pose shown in FIG. 1D, robot 100 is in a wrist singularity condition, due to the alignment of the axes of rotation of wrist 118 and elbow/forearm 114, 116 along axis 134.

Figure 1E:
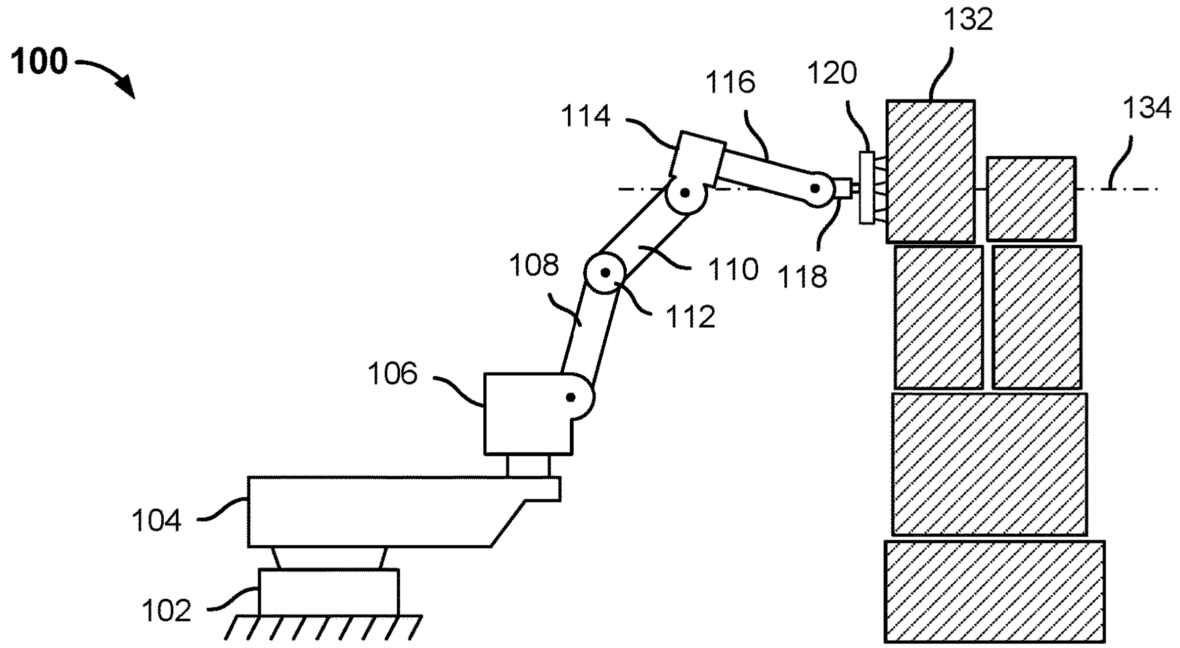
FIG. 1E is a diagram illustrating an embodiment of a robotic system comprising a robotic arm with an articulated upper arm in a pose in which a joint in the articulated upper arm is used to avoid singularity.

FIG. 1E is a diagram illustrating an embodiment of a robotic system comprising a robotic arm with an articulated upper arm in a pose in which a joint in the articulated upper arm is used to avoid singularity. In the example shown, item 132 is nearer to the base 102 of robot 100, e.g., the robot 100 has been moved closer to the item 132, e.g., by a mobile chassis (not shown). In the pose shown in FIG. 1E, added elbow 112 is bent, bringing elbow 114 closer to shoulder 106 (than in the pose as shown in FIG. 1D) and thereby avoiding the wrist singularity illustrated in FIG. 1D.

Figure 2A:
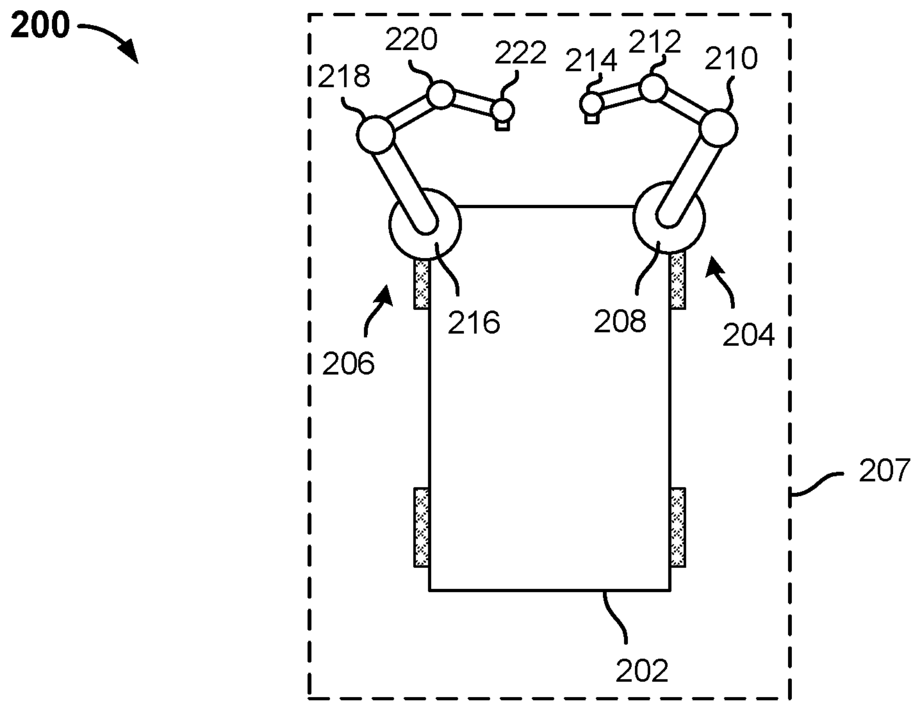
FIG. 2A is a diagram illustrating an embodiment of a robotic system comprising two robotic arms, each with an articulated upper arm.

FIG. 2A is a diagram illustrating an embodiment of a robotic system comprising two robotic arms, each with an articulated upper arm. In the example shown, mobile robot 200 comprises a mobile chassis 202, e.g., a robotically-controlled and, in some embodiments, autonomously-operated chassis, on which two 7DOF or 8DOF robotic arms 204, 206 are disposed. The robot 200 has been driven (i.e., has driven itself) into a truck or other container 207, e.g., to load or unload boxes or other items into/from the truck or other container 207. The walls of the truck/container 207, shown in dashed lines, define a confined space within which the robot 200 must operate to perform an assigned set of tasks, e.g., to load or unload the truck/container 207. The robotic arms 204, 206 must be operated in a manner that enables them to efficiently and cooperatively load/unload items, without colliding or otherwise interfering with each other or the sides of truck/container 207.

In the example shown in FIG. 2A, each the robotic arms 204, 206 comprises elements arranged as shown in FIG. 1A, for example. Specifically, in the example shown, robotic arm 204 includes a shoulder 208, an "extra" elbow 210 disposed between the shoulder 208 and distal elbow 212, and a wrist assembly 214, along with intervening links. Similarly, robotic arm 206 includes shoulder 216, "extra" elbow 218, distal elbow 220, and wrist assembly 222.

As shown in FIG. 2A, the "extra" elbows 210, 218 provide added flexibility for the robotic arms 204, 206 to be used to perform tasks within the confined operating space of truck/container 207, including picking/placing items very near mobile chassis 202, while keeping the distal elbows 212, 220 and other joints from colliding with the sidewalls of truck/container 207 or with each other or other elements comprising the robotic arms 204, 206.

Figure 2B:
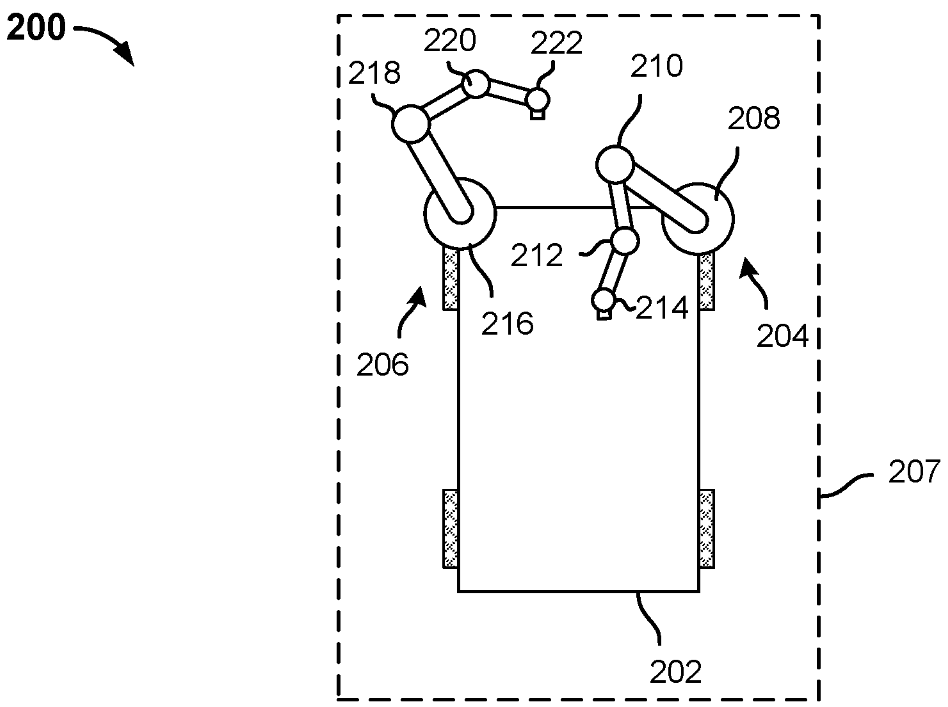
FIG. 2B is a diagram illustrating an embodiment of a robotic system comprising two robotic arms, each with an articulated upper arm.

FIG. 2B is a diagram illustrating an embodiment of a robotic system comprising two robotic arms, each with an articulated upper arm. In the example shown, robotic arm 204 is in a pose to reach behind its shoulder 204, e.g., to pick an item from or place an item on a conveyance structure (not shown) such as may be disposed on or over the central longitudinal axis of chassis 202, e.g., a conveyor positioned to pull items out of or feed items into the space between the robotic arms 204, 206. In the pose shown, the "extra" elbow 212 of robotic arm 204 is bent back to enable an end effector (not shown) mounted on wrist assembly 214 to be used to pick from or place to a location on or above chassis 202 without unduly obstructing the robotic arm 206 from being used to pick from or place to a location on or above 202, e.g., a location nearer to shoulder 216.

In the examples shown in FIGS. 1A-E and 2A-B, an "extra" elbow joint has been positioned between the shoulder and (distal or traditional 6DOF) elbow, to enable the distance between the shoulder and elbow to be varied (e.g., shortened or lengthened) as/if need to avoid a singularity.

In some alternative embodiments, modular joints are used to provide a robot with variable distance between adjacent joints, such as shoulder/elbow. The robotic arm comprises modular joints that can be connected together with aluminum tubes or carbon fiber/aluminum hybrid. Tubes/links of length associated with desired (e.g., shorter or longer) distance between joints may be selected. Using such a design, the robotic arm is not limited to fixed spacing, decided at robot design time, between adjacent joints. For a given context or application (robot use), links of length most likely to avoid singularity are selected. Variants for various applications may have different link lengths and size of the modular joints. For new applications and associate robotic arm tasks (e.g., trajectories, work environment, other constraints), tubes/links of lengths appropriate for the new application may be determined and provided. In various embodiments, use of lightweight tubes/links enables very lightweight robots for 8DOF robot applications, e.g., by reducing the overall weight of the robot system, minimizes operating costs like electricity, enabling fully battery-operated systems, etc.

A further alternative approach, in various embodiments, is to use an extendable/retractable upper arm link to vary the distance between adjacent joints, such as shoulder and elbow. In some embodiments, a linear actuator extends/retracts the upper arm to vary distance between joints, e.g., to avoid or move out of singularity.

Figure 3A:
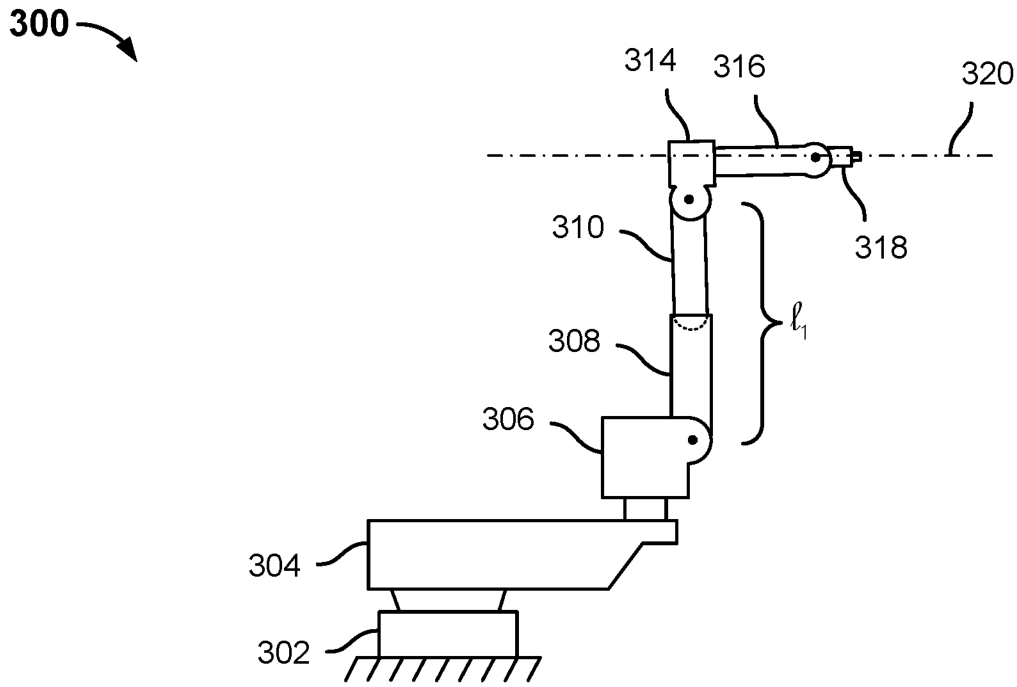
FIG. 3A is a diagram illustrating an embodiment of a robotic system comprising a robotic arm with a variable length upper arm in a position associated with singularity.

FIG. 3A is a diagram illustrating an embodiment of a robotic system comprising a robotic arm with a variable length upper arm in a position associated with singularity. In the example shown, robot 300 includes a fixed base 302 and a rotatably mounted extender or platform 304. Shoulder 306 is rotatably mounted at a distal end of the extender or platform 304. A variable length upper arm comprising proximal segment 308 and distal segment 310 is bendably connected at a proximal end to shoulder 306 and at a distal end to elbow 314, which in turn is connected via forearm 316 to wrist assembly 318.

In the pose shown in FIG. 3A, the variable length upper arm 308, 310 is deployed to a length $l_1$, e.g., by operation of a hydraulic actuator, a linear bearing, or some other linear drive mechanism, resulting in a singularity condition due to the alignment of elbow 314, forearm 316, and wrist assembly 318 along axis 320.

Figure 3B:
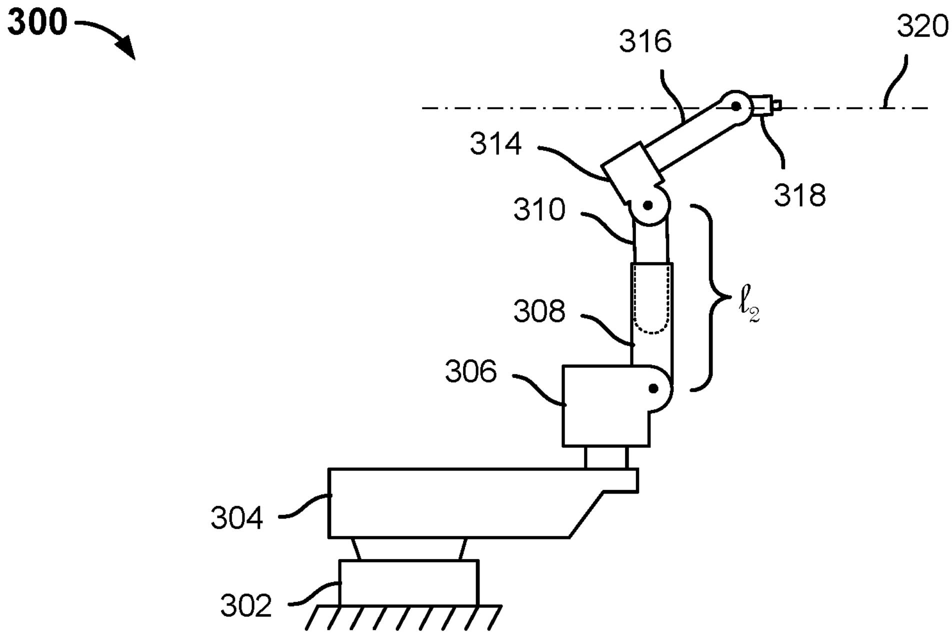
FIG. 3B is a diagram illustrating an embodiment of a robotic system comprising a robotic arm with a variable length upper arm in a pose in which the length of the upper arm has been shortened to avoid singularity.

FIG. 3B is a diagram illustrating an embodiment of a robotic system comprising a robotic arm with a variable length upper arm in a pose in which the length of the upper arm has been shortened to avoid singularity. In the pose shown in FIG. 3B, the length of the variable length upper arm 308, 310 has been shortened to a length $l_2<l_1$, shortening the distance from shoulder 306 to elbow 314, thereby avoiding the singularity condition illustrated by FIG. 3A.

In some alternative embodiments, the segment between shoulder 306 and elbow 314 is varied by replacing a tube or other lightweight removable link of length $l_1$ with one of length $l_2$. For example, prior to deploying robot 300, an engineer or technician may determine which length for the segment between shoulder 306 and elbow 314 is most likely to facilitate efficient operation and performance of robot 300 while avoiding singularities (or, in some embodiments, making such conditions less likely to occur).

Figure 4:
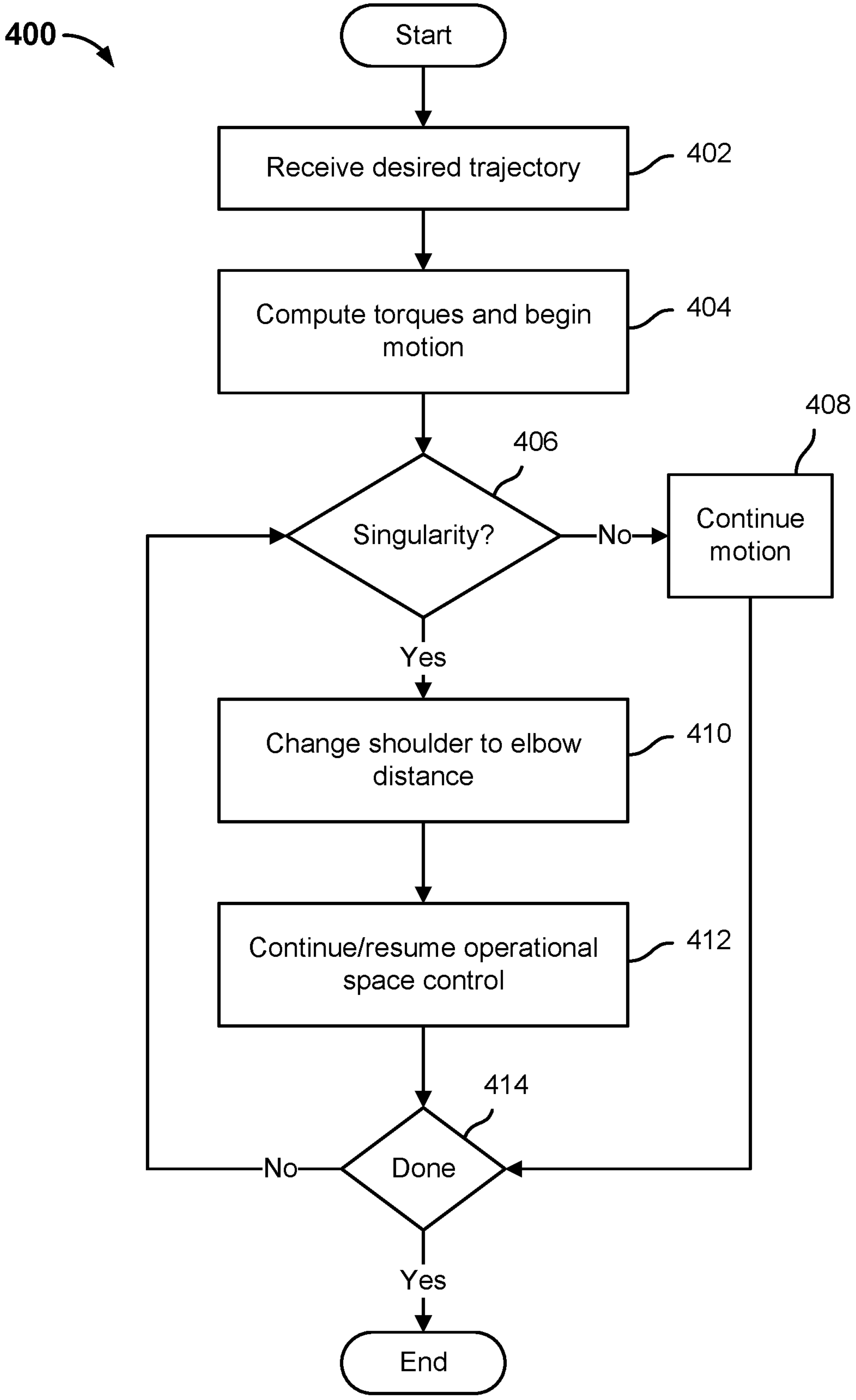
FIG. 4 is a flow diagram illustrating an embodiment of a process to control a robotic arm having an articulated or variable length segment.

FIG. 4 is a flow diagram illustrating an embodiment of a process to control a robotic arm having an articulated or variable length segment. In various embodiments, process 400 of FIG. 4 may be implemented by a control computer, such as a computer configured to a control a 7DOF or higher DOF robot, as disclosed herein. In the example shown, at 402 a desired end effector trajectory is received. Referring to the example shown in FIGS. 1B and 1C, for example, a trajectory may be determined and/or received to move the end effector 120, with item 122 in its grasp, through a trajectory of {x, y, z} positions in three-dimensional space while holding the end effector in the orientation {roll, pitch, yaw} as shown. At 404, joint motor torque commands and sequencing to move the end effector through the trajectory received at 402 are computed and begin to be implemented. At 406, the planned and ongoing motion of the robotic arm and its component elements is monitored. If no singularity condition is approached or indicated (406), motion continues (408). If at 406 an indication is received that the current (i.e., next portion) of the motion plan may place the robotic arm in a singularity condition, then at 410 the "extra" elbow comprising the robotic arm is actuated to change the shoulder to elbow distance, after which motion planning using operational control resumes at 412. The direction and degree of operation of the extra elbow may depend on the task being performed, one or more heuristics, context information such as obstacles or space limitations, learned approaches to using the extra elbow to avoid singularities, etc. Processing continues until the task being performed by the robotic arm is done (414).

Figure 5:
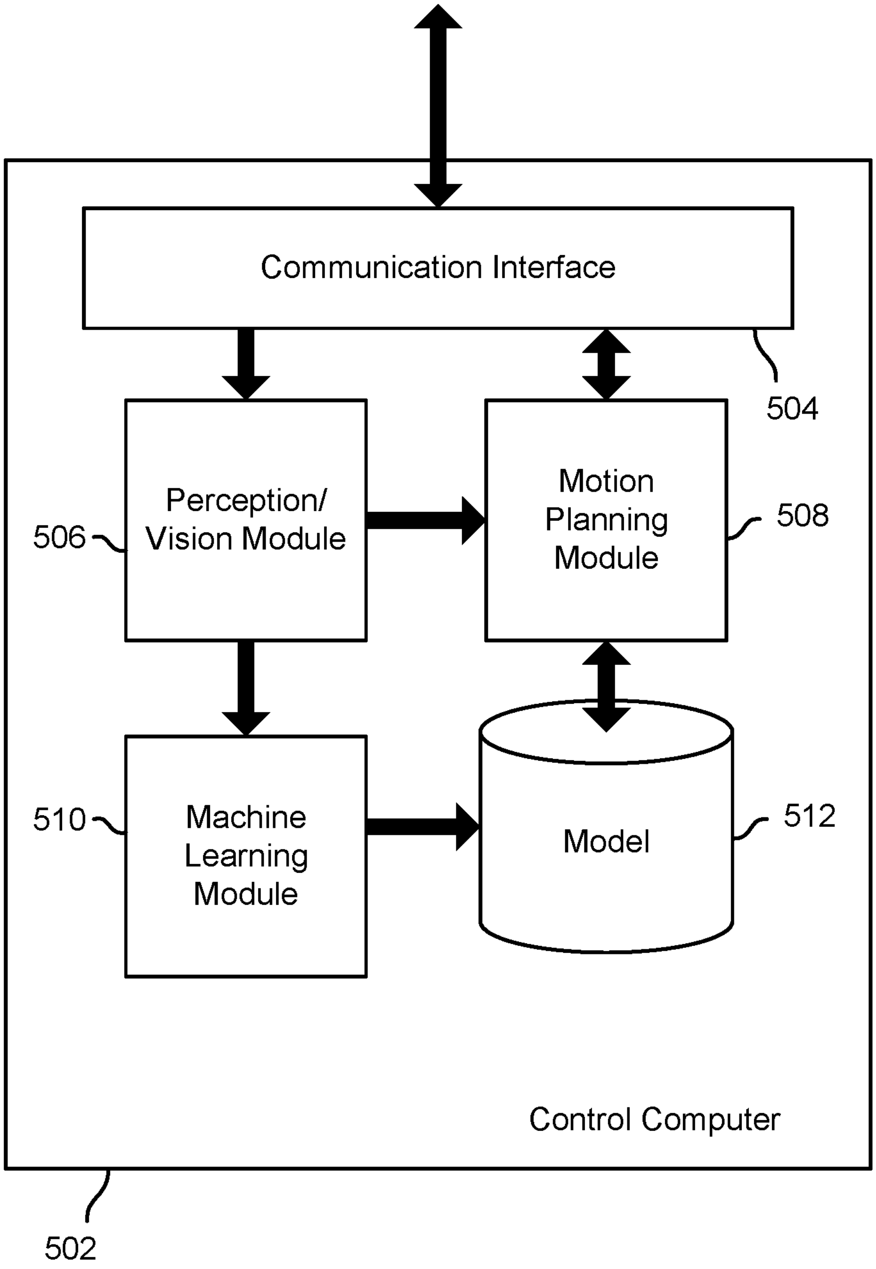
FIG. 5 is a block diagram illustrating an embodiment of a control computer to control a robotic arm having an articulated or variable length segment.

FIG. 5 is a block diagram illustrating an embodiment of a control computer to control a robotic arm having an articulated or variable length segment. In various embodiments, the control computer 502 may be used to control a robotic arm having an "extra" elbow, as disclosed herein, such as a 7DOF or 8DOF robotic arm. In the example shown, control computer 502 includes a communication interface 504, such as a wireless or wired communication interface. In various embodiments, control computer 502 may receive/provide one or more of the following via communication interface 504: image data, sensor readings, joint/motor position or other feedback, joint motor torque commands, etc. Image data (e.g., 3D camera output comprising RGB or other 2D image data and depth pixel information) and/or other sensor data (e.g., LIDAR, infrared, etc.) received via communication interface 504 are provided to perception/vision module (subsystem) 506, which uses the information to construct a three-dimensional view of at least a portion of the workspace in which the robot is operating. The three-dimensional view may include an estimate of the state of the robotic arm and its component parts and of items in the workspace, such as a stack of items being formed (or picked from) by the robot, a specific item to be picked/placed, etc.

In the example shown, the perception/vision module (subsystem) 506 provides the three-dimensional view to one or both of a motion planning module (subsystem) 508 and a machine learning module 510. Motion planning module 508 uses the three-dimensional view and one or more models 512 to generate a motion plan to use the robotic arm to move an item through a trajectory. Models 512 may include one or more of the following: a kinematic model of the robotic arm; heuristics, hard coded, or learned strategies to use an "extra" elbow joint to avoid singularities, for a given robotic application, task, context, etc.; and models indicating one or more attributes of an item or class of item and/or strategies to grasp or move a given item.

In various embodiments, a motion plan determined by motion planning module 508 may include a series of joint motor torque commands calculated to cause the joints of the robotic arm to be actuated in a manner that moves the joints and links comprising the arm each through a sequence of movements that result in the end effector and/or item being moved through the received trajectory. In various embodiments, the motion plan may include actuation of an "extra" elbow joint, included in a robotic arm as disclosed herein, in a manner such that singularity conditions are avoided.

In various embodiments, machine learning module 510 may use three-dimensional view information received from perception/vision module 506 to learn how best to use the joints comprising a robotic arm, including an "extra" elbow joint as disclosed herein, to perform tasks efficiently while avoiding singularity conditions. For example, in a learning/training phase or mode of operation, the machine learning module 510 may observe as a human operator controls the robot (e.g., via teleoperation) to perform a set of tasks, including use of an extra joint, as disclosed herein, to avoid singularities. In some embodiments, machine learning module 510 may observe the robot in normal, non-training operations, and may learn strategies to operate the robot to perform tasks efficiently while avoiding singularities. In various embodiments, machine learning module 510 may encode or otherwise embody in one or more models included in models 512 observed and/or learned knowledge as to how best to use the joints comprising a robotic arm, including an "extra" elbow joint as disclosed herein, to perform tasks efficiently while avoiding singularities.

Figure 6:
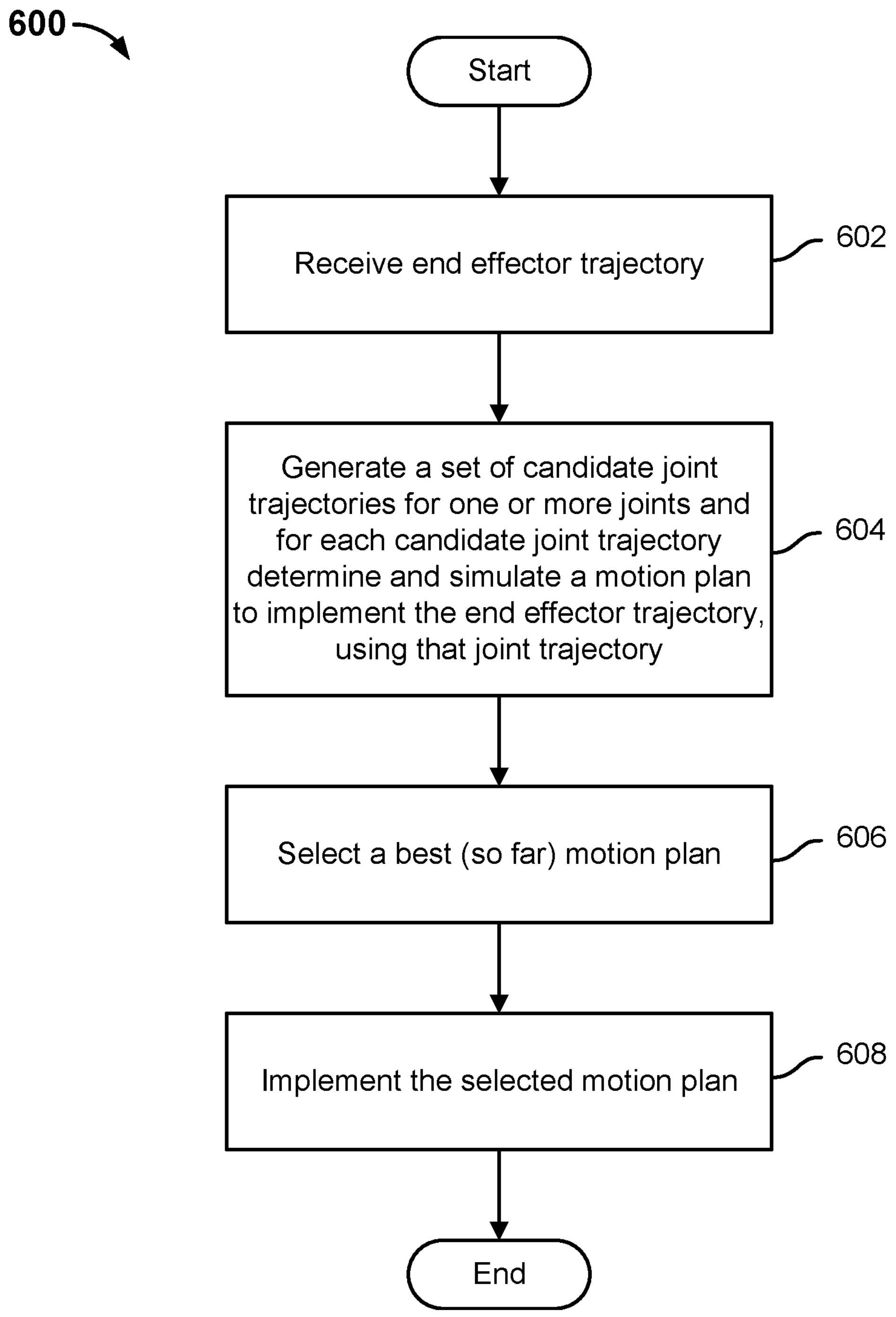
FIG. 6 is a flow diagram illustrating an embodiment of a process to control a robotic arm having an articulated or variable length segment.

FIG. 6 is a flow diagram illustrating an embodiment of a process to control a robotic arm having an articulated or variable length segment. In various embodiments, the process 600 of FIG. 6 may be implemented by a control computer, such as control computer 502 of FIG. 5, and may be used to control a robotic arm having an "extra" elbow, as disclosed herein, such as a 7DOF or 8DOF robotic arm. In the example shown, at 602 an end effector trajectory is received. At 604, the control computer generates a set of candidate joint trajectories for each of one or more joints (e.g., for the extra elbow joint) and for each candidate joint trajectory (or set of trajectories, if for multiple joints) a motion plan to move the end effector through the end effector trajectory received at 602 is determined and simulated. For example, for each candidate joint trajectory a motion plan may be determined and simulated to determine whether the end effector trajectory would be achieved efficiently and without collision. For each candidate joint trajectory, the simulation may determine whether and/or the extent to which the motion plan satisfies one or more selection criteria, such as a computed cost (e.g., time, energy, interference with other robotic arms, etc.). At 606, a joint trajectory and associated motion plan is selected. For example, the motion plan that performed best in simulation may be selected. The selection may be triggered by time or occurrence of an event, such as completion of another task by the same or another robotic arm. At 608, the selected motion plan is implemented.

In various embodiments, the joint trajectory (or trajectories) iteratively selected at 604 may include a trajectory select for each of one or more joints that provide an added degree of freedom. For example, in a 7DOF robot, a trajectory may be selected for one joint. In some embodiments, a trajectory for an element or elements of the robotic arm other than a single joint may be used. For example, a "posture" trajectory for one or more elements, in addition to or instead of a joint, may be used. In some embodiments, the end effector trajectory may be broken down into phases, and for each phase a joint other posture trajectory may be determined and used to find a best motion plan to achieve the end effector trajectory through that phase.

In various embodiments, a joint or other posture trajectory may be determined randomly and/or based on one or more heuristics. For example, a parabolic trajectory within given parameters may be considered most likely to yield a good (best) result for a certain type or task or robotic application, such as stacking items on a pallet, unloading items from a truck, etc.

In various embodiments, motion plans associated with 1,000 or more iteratively selected joint/posture trajectories may be simulated at 604 before a best motion plan is selected at 606.

A 6DOF robot is considered minimally suitable to perform certain tasks in an industrial setting, in part because the six degrees of freedom enable any end effector trajectory with the operational reach of the robotic arm to be realized. That is, the six degrees of freedom enable the six variables required to realize an end effector trajectory using operational space control—i.e., end effector position in x, y, and z coordinates along with end effector orientation in terms of roll, pitch, and yaw—to be controlled. However, a 6DOF robot can realize a given end effector trajectory in only one or very few ways, in terms of the poses through which the robotic arm and its component joints and links must be moved to realize a given end effector trajectory. Depending on the starting pose, a 6DOF robotic arm may not be able to avoid a singularity condition or may be required to move through a convoluted sequence of poses to reposition its joints and/or links to achieve a given end effector trajectory without reach a singularity condition.

By contrast, by using the robotic arm structures and control techniques disclosed herein, in various embodiments, a 7DOF, 8DOF, or other robotic arm with an "extra" elbow or similar joint, a robotic system as disclosed herein may have numerous ways to achieve an end effector trajectory without entering or approaching any singularity condition.

In some embodiments, a robotic system as disclosed herein may be configured and/or may learn to favor certain poses for at least a distal portion of the robotic arm, e.g., from the distal elbow to the end effector. Other joints, including the "extra" (proximal) elbow joint as disclosed herein, such as joint 112 in the example shown in FIG. 1A, may be operated as needed to achieve an end effector trajectory while at least tending to maintain the remaining, distal joints and segments in, near, or nearer to the preferred pose. For example, when iterating through joint trajectories as in step 604 of process 600 of FIG. 6, a higher cost may be associated with motion plans that would deviate (more) from the preferred or favored pose of the distal joints and links. In this aspect, the cost function may act somewhat like a virtual "rubber band", tending to pull those elements back into/toward the preferred configuration.

In various embodiments, techniques disclosed herein may be used, singly or in any combination, to provide a robot that will avoid or more readily be able to move out of singularity conditions associated with controlling a robotic arm using operational space control.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:

a robotic arm comprising a plurality of segments connected serially via a plurality of motor operated joints, each motor operated joint providing a corresponding degree of freedom of movement of the robotic arm, the robotic arm being configured to have an end effector disposed at a distal end, and the plurality of motor operated joints including a first motor operated joint that connects a first segment to a second segment, the first segment being connected at an end of the first segment opposite the first motor operated joint to a motor operated shoulder joint of the robotic arm and the second segment being connected at an end of the second segment opposite the first motor operated joint to a motor operated elbow joint of the robotic arm; and a processor coupled to the robotic arm and configured to:

receive an end effector trajectory indicating a set of positions and orientations through which the end effector is to be moved from a start position and start orientation to an end position and end orientation;

determine a motion plan to actuate the respective motors of the plurality of joints to move the end effector through the end effector trajectory;

receive an indication that an upcoming segment of the motion plan may place the robotic arm in a singularity position; and use the first motor operated joint to vary a distance between the motor operated shoulder joint and the motor operated elbow joint, as needed, to enable the end effector to be moved through the end effector trajectory without the robotic arm being placed in the singularity position.

2. The system of claim 1, wherein the motion plan avoids placing the robotic arm or any portion thereof in a position associated with a singularity.

3. The system of claim 1, wherein using the first motor operated joint to vary a distance between the motor operated shoulder joint and the motor operated elbow joint enables one or both of end effector acceleration and end effector speed to be optimized.

4. The system of claim 1, wherein using the first motor operated joint to vary a distance between the motor operated shoulder joint and the motor operated elbow joint enables the joints and links other than the first joint to be moved at higher speed while avoiding collision.

5. The system of claim 1, wherein a first axis of rotation of the first joint is parallel to a second axis of rotation of the shoulder joint and a third axis of rotation of the elbow joint.

6. The system of claim 1, wherein the robotic arm comprises a seven degree of freedom (7DOF) robotic arm.

7. The system of claim 6, wherein the 7DOF robotic arm is mounted on a rotatably mounted extender structure that provides an eighth degree of freedom.

8. The system of claim 1, wherein the robotic arm is mounted on a mobile chassis.

9. The system of claim 8, wherein the processor is further configured to control movement of the mobile chassis to position the robotic arm in a position associated with the end effector trajectory.

10. The system of claim 9, wherein the processor is configured to select the position at least in part to facilitate use of the first joint to avoid placing the robotic arm or any portion thereof in a position associated with a singularity.

11. The system of claim 1, wherein the processor is configured to determine the motion plan at least in part by iteratively selecting a joint or other posture trajectory, generating a motion plan based at least in part on the joint or other posture trajectory, and selecting for implementation a motion plan that best satisfies a selection criteria.

12. The system of claim 11, wherein the selection criteria comprises a cost function.

13. The system of claim 1, wherein the robotic arm comprises a first robotic arm that is mounted on a mobile chassis along with one or more other robotic arms.

14. The system of claim 1, wherein the processor is further configured to operate the first joint in a manner that enables the end effector trajectory to be realized without having any part of the robotic arm collide with a structure that defines a limit of or is present in an operating space in which the robotic arm is being used.

15. The system of claim 1, wherein the processor is further configured to use machine learning techniques to learn one or more strategies to use the first joint to operate the robotic arm in a manner that avoids placing the robotic arm or any portion thereof in a position associated with a singularity.

16. The system of claim 1, wherein the first joint comprises a linear joint configured to vary the combined length of the first segment and the second segment.

17. The system of claim 1, wherein the processor is configured to break the end effector trajectory down into two or more phases and to determine a respective motion plan for each phase.

18. A method to control a robotic arm comprising a plurality of segments connected serially via a plurality of motor operated joints, each motor operated joint providing a corresponding degree of freedom of movement of the robotic arm, the robotic arm being configured to have an end effector disposed at a distal end, and the plurality of motor operated joints including a first motor operated joint that connects a first segment to a second segment, the first segment being connected at an end of the first segment opposite the first joint to a motor operated shoulder joint of the robotic arm and the second segment being connected at an end of the second segment opposite the first joint to a motor operated elbow joint of the robotic arm, the method comprising:

receiving an end effector trajectory indicating a set of positions and orientations through which the end effector is to be moved from a start position and start orientation to an end position and end orientation;

using a processor to determine a motion plan to actuate the respective motors of the plurality of motor operated joints to move the end effector through the end effector trajectory;

receiving an indication that an upcoming segment of the motion plan may place the robotic arm in a singularity position; and using the first motor operated joint to vary a distance between the motor operated shoulder joint and the motor operated elbow joint, as needed, to enable the end effector to be moved through the end effector trajectory without the robotic arm being placed in the singularity position.

19. The method of claim 18, wherein the motion plan avoids placing the robotic arm or any portion thereof in a position associated with a singularity.

20. The method of claim 18, wherein a first axis of rotation of the first joint is parallel to a second axis of rotation of the shoulder joint and a third axis of rotation of the elbow joint.

21. The method of claim 18, wherein the processor is configured to determine the motion plan at least in part by iteratively selecting a joint or other posture trajectory, generating a motion plan based at least in part on the joint or other posture trajectory, and selecting for implementation a motion plan that best satisfies a selection criteria.

22. A computer program product to control a robotic arm comprising a plurality of segments connected serially via a plurality of motor operated joints, each motor operated joint providing a corresponding degree of freedom of movement of the robotic arm, the robotic arm being configured to have an end effector disposed at a distal end, and the plurality of motor operated joints including a first motor operated joint that connects a first segment to a second segment, the first segment being connected at an end of the first segment opposite the first joint to a motor operated shoulder joint of the robotic arm and the second segment being connected at an end of the second segment opposite the first joint to a motor operated elbow joint of the robotic arm, the computer program product being embodied in a non-transitory computer readable medium and comprising computer instructions for:

receiving an end effector trajectory indicating a set of positions and orientations through which the end effector is to be moved from a start position and start orientation to an end position and end orientation;

determining a motion plan to actuate the respective motors of the plurality of motor operated joints to move the end effector through the end effector trajectory;

receiving an indication that an upcoming segment of the motion plan may place the robotic arm in a singularity position; and using the first motor operated joint to vary a distance between the motor operated shoulder joint and the motor operated elbow joint, as needed, to enable the end effector to be moved through the end effector trajectory without the robotic arm being placed in the singularity position.

23. The computer program product of claim 22, wherein the motion plan avoids placing the robotic arm or any portion thereof in a position associated with a singularity.

24. The computer program product of claim 22, wherein a first axis of rotation of the first joint is parallel to a second axis of rotation of the shoulder joint and a third axis of rotation of the elbow joint.

* * * * *